US012668688B2

(12) United States Patent (10) Patent No.: US 12,668,688 B2
Jamieson et al. (45) Date of Patent: Jun. 30, 2026

(54) POLYETHYLENE COMPOSITION FOR A FILM LAYER

(71) Applicant: Borealis AG, Vienna (AT)

(72) Inventors: John Jamieson, Porvoo (FI); Ravindra Tupe, Espoo (FI); Pauli Leskinen, Porvoo (FI); Jarmo Kela, Porvoo (FI)

(73) Assignee: BOREALIS GMBH, Vienna (AT)

( * ) Notice: Subject to any disclaimer, the term of this patent is extended or adjusted under 35 U.S.C. 154(b) by 955 days.

(21) Appl. No.: 17/910,124

(22) PCT Filed: Mar. 17, 2021

(86) PCT No.: PCT/EP2021/056818
§ 371 (c)(1),
(2) Date: Sep. 8, 2022

(87) PCT Pub. No.: WO2021/191019
PCT Pub. Date: Sep. 30, 2021

(65) Prior Publication Data
US 2023/0193002 A1 Jun. 22, 2023

(30) Foreign Application Priority Data
Mar. 24, 2020 (EP) ..................................... 20165146

(51) Int. Cl.
C08L 23/0807 (2025.01)
C08F 210/02 (2006.01)
C08J 5/18 (2006.01)

(52) U.S. Cl.
CPC ........ C08L 23/0815 (2013.01); C08F 210/02 (2013.01); C08J 5/18 (2013.01); C08J 2323/08 (2013.01); C08J 2423/06 (2013.01); C08L 2203/16 (2013.01); C08L 2205/025 (2013.01)

(58) Field of Classification Search
CPC ............. C08L 23/0815; C08L 2203/16; C08L 2205/025; C08L 2205/035; C08L 2308/00; C08L 2314/06; C08L 23/06; C08F 210/02; C08F 4/65912; C08F 4/65916; C08F 210/16; C08F 2500/05; C08F 2500/08; C08F 2500/12; C08F 2/001; C08F 4/65925; C08F 210/08; C08F 210/14; C08F 2500/07; C08F 2500/02; C08F 2500/26; C08J 5/18; C08J 2323/08; C08J 2423/06
See application file for complete search history.

(56) References Cited

U.S. PATENT DOCUMENTS

| | | | |
|---|---|---|---|
| 2015/0051364 A1* | 2/2015 | Vahteri ................... | C08L 23/04 526/348.6 |
| 2017/0327678 A1* | 11/2017 | Kela ..................... | C08F 210/16 |
| 2020/0392269 A1* | 12/2020 | Ferrari ................ | C08L 23/0815 |

FOREIGN PATENT DOCUMENTS

| | | |
|---|---|---|
| WO | 20160083208 A1 | 6/2016 |
| WO | 2019013378 A1 | 7/2019 |
| WO | 20200012314 A2 | 1/2020 |

OTHER PUBLICATIONS

International Search Report for Application No. PCT/EP2021/056818 Dated May 31, 2021.

* cited by examiner

*Primary Examiner* — Alicia Bland
(74) *Attorney, Agent, or Firm* — Lippes Mathias LLP

(57) ABSTRACT
The present invention relates to a multimodal polymer of ethylene, to the use of the multimodal polymer of ethylene in film applications and to a film comprising the multimodal polymer of ethylene of the invention.

17 Claims, No Drawings

POLYETHYLENE COMPOSITION FOR A FILM LAYER

CROSS REFERENCE TO RELATED APPLICATIONS

This is a 371 of PCT Application No. PCT/EP2021/056818, filed Mar. 17, 2021, which claims the benefit of European Application No. 20165146.0, filed Mar. 24, 2020, the contents of which are incorporated herein in their entirety.

BACKGROUND

The present invention relates to a multimodal polymer of ethylene, to the use of the multimodal polymer of ethylene in film applications and to a film comprising the polymer composition of the invention.

Unimodal polyethylene (PE) polymers, for instance SSC products, are usually used for film application. Unimodal PE polymers have for instance good optical properties, like low haze, but for instance, the melt processing of such polymers is not satisfactory in production point of view and may cause quality problems of the final product as well. Multimodal PE polymers with two or more different polymer components are better to process, but e.g. melt homogenisation of the multimodal PE may be problematic resulting to inhomogeneous final product evidenced e.g. with high gel content of the final product.

EP 1472298 A of Borealis discloses multimodal PE polymer compositions having two different comonomers, being produced with a Ziegler-Natta type catalyst. The multimodal PE polymers are polymerized in the presence of a metallocene catalyst. Examples disclose multimodal PE polymer having two polymer components with, for instance, different type of comonomers. The publication does seem to define any range for the melt flow ratio, $MFR_{21}/MFR_2$ ($FRR_{21/2}$), of the final multimodal PE polymer, however said melt flow ratio of the exemplified polymers vary within the range of 38-55. Films made from terpolymers (Example 8, polymer from Example 6 and 7) show a quite low dart drop impact (DDI) of below 90 g (measured on a film with thickness of 25 µm).

There is a continuous need to find multimodal PE polymers with different property balances for providing tailored solutions to meet the increasing demands of the end application producers e.g. for reducing the production costs while maintaining or even improving the end product properties. Tailored polymer solutions are also needed to meet the requirements of continuously developing equipment technology in the end application field.

DETAILED DESCRIPTION OF THE INVENTION

The present invention is directed to a multimodal polymer of ethylene with at least two different comonomers selected from alpha-olefins having from 4 to 10 carbon atoms, which has
a) $MFR_2$ of 0.5 to 10 g/10 min (according to ISO 1133 at 190° C. under 2.16 kg load),
b) $MFR_{21}/MFR_2$ of 13 to 35 ($MFR_{21}$ at 190° C. under 21.6 kg load) and
c) Mw/Mn of 4.5 to <6;
and which comprises at least an ethylene polymer component (A), comprising ethylene polymer fraction (A-1) and ethylene polymer fraction (A-2) and
an ethylene polymer component (B), wherein the $MFR_2$ of the ethylene polymer components (A) and (B) are different from each other,
and wherein the $MFR_2$ of the ethylene polymer fractions (A-1) and (A-2) are different from each other,
and wherein the density of the ethylene polymer fractions (A-1) and (A-2) are different by 5 kg/m³ up to 35 kg/m³.

Term "multimodal" in context of multimodal polymer of ethylene means herein multimodality with respect to melt flow rate (MFR) of the ethylene polymer components (A) and (B) as well as ethylene polymer fraction (A-1) and (A-2), i.e. the ethylene polymer components (A) and (B, as well as fractions (A-1) and (A-2) have different MFR values. The multimodal polymer of ethylene (1) can have further multimodality with respect to one or more further properties between the ethylene polymer components (A) and (B) as well as between fractions (A-1) and (A-2), as will be described later below.

The multimodal polymer of ethylene of the invention as defined above, below or in claims is also referred herein shortly as "multimodal PE".

The ethylene polymer component (A) and the ethylene polymer component (B), when both mentioned, are also referred as "ethylene polymer component (A) and (B)".

Unexpectedly the polymer composition of the invention provides improved optical properties such as especially gloss and/or haze.

The invention is further directed to a film comprising at least one layer comprising the multimodal PE. The film can be a monolayer film comprising the multimodal PE or a multilayer film, wherein at least one layer comprises the multimodal PE. The terms "monolayer film" and multilayer film" have well known meanings in the art.

The following preferable embodiments, properties and subgroups of multimodal PE and the ethylene polymer components (A) and (B) thereof, as well as the ethylene polymer fractions (A-1) and (A-2) and the film of the invention including the preferable ranges thereof, are independently generalisable so that they can be used in any order or combination to further define the preferable embodiments of the multimodal PE and the article of the invention.

Multimodal PE as Well as Ethylene Polymer Component (A) and (B) and Ethylene Polymer Fractions (A-1) and (A-2)

The multimodal polymer of ethylene is referred herein as "multimodal", since the ethylene polymer component (A), including ethylene polymer fractions (A-1) and (A-2), and ethylene polymer component (B) have been produced under different polymerization conditions resulting in different Melt Flow Rates (MFR, e.g. $MFR_2$). I.e. the multimodal PE is multimodal at least with respect to difference in MFR of the ethylene polymer components (A) and (B) as well as of ethylene polymer fractions (A-1) and (A-2).

As stated above the MFR2 of the ethylene polymer fractions (A-1) and (A-2) are different from each other.

Preferably, the ethylene polymer fraction (A-1) has a $MFR_2$ of 0.01 to 10 g/10 min, preferably of 0.1 to 5.0 g/10 min, more preferably of 0.2 to 1.5 g/10 min.

Preferably, the ethylene polymer fraction (A-2) has a $MFR_2$ of >10.0 to 150.0 g/10 min, preferably of 12.0 to 130 g/10 min more preferably of 15.0 to 120 g/10 min.

As stated above the $MFR_2$ of the ethylene polymer components (A) and (B) are different from each other.

Preferably, the ethylene polymer component (A) has a $MFR_2$ of >1.0 to 50 g/10 min, preferably of 1.5 to 40, more preferably of 2.0 to 30, more preferably of 2.5 to 20, more preferably of 3.0 to 15, even more preferably of 3.5 to 10.0 g/10 min.

Preferably, the ethylene polymer component (B) has a $MFR_2$ of 0.01 to 1.0 g/10 min, preferably of 0.05 to 0.95, more preferably of 0.10 to 0.90, more preferably of 0.15 to 0.85, even more preferably of 0.20 to 0.80 g/10 min.

It is preferred the ratio of the $MFR_2$ of ethylene polymer component (A) to the $MFR_2$ of the final multimodal polymer of ethylene is of 2.0 to 40, preferably of 2.5 to 30, more preferably of 3.0 to 20 and even more preferably of 3.5 to 10.

If the $MFR_2$ of ethylene polymer components, e.g. component (B), cannot be measured, because it cannot be isolated from the mixture of at least ethylene polymer components (A) or (B), then it can be calculated ($MI_2$ below) using so called Hagström equation (Hagström, The Polymer Processing Society, Europe/Africa Region Meeting, Gothenburg, Sweden, Aug. 19-21, 1997):

$$MI_b = \left( w \cdot MI_1^{-\frac{w-b}{a}} + (1-w) \cdot MI_2^{-\frac{w-b}{a}} \right)^{-a \cdot w^b} \qquad \text{(eq. 3)}$$

According to said Hagström, in said equation (eq.3), a=5.2 and b=0.7 for $MFR_2$. Furthermore, w is the weight fraction of the other ethylene polymer component, e.g. component (A), having higher MFR. The ethylene polymer component (A) can thus be taken as the component 1 and the ethylene polymer component (B) as the component 2. $MI_b$ is the $MFR_2$ of the final polymer of ethylene (1). The $MFR_2$ of the ethylene polymer component (B) ($MI_2$) can then be solved from equation 1 when the $MFR_1$ of the ethylene polymer component (A) ($MI_1$) and the final polymer of ethylene (1) ($MI_b$) are known.

In the same way the MFR for ethylene polymer fraction (A-2) can be calculated from MFR (A-1), MFR (A) and the corresponding weight ratios The ethylene polymer fraction (A1) can thus be taken as the component 1 and the ethylene polymer fraction (A2) as the component 2. $MI_b$ is the $MFR_2$ of the ethylene polymer component (A). The $MFR_2$ of the ethylene polymer fraction (A2) ($MI_2$) can then be solved from equation 1 when the $MFR_1$ of the ethylene polymer fraction (A1) ($MI_1$) and the ethylene polymer component (A) ($MI_b$) are known.

The at least two alpha-olefin comonomers having from 4 to 10 carbon atoms of the polymer of ethylene (1) are preferably 1-butene and 1-hexene.

Naturally, in addition to multimodality with respect to, i.e. difference between, the MFR of ethylene polymer components (A) and (B) as well as of ethylene polymer fractions (A-1) and (A-2), the multimodal PE of the invention can also be multimodal e.g. with respect to one or both of the two further properties:

multimodality with respect to, i.e. difference between,
the comonomer type or the comonomer content(s) present in the ethylene polymer components (A) and (B), or both the type and content(s) of comonomers present in the ethylene polymer components (A) and (B), whereby the comonomer type of ethylene polymer fractions (A-1) and (A-2) is the same; and/or
the density of the ethylene polymer components (A) and (B) and density of the ethylene polymer fractions (A-1) and (A-2).

Preferably, the multimodal polymer of ethylene is further multimodal with respect to comonomer type and/or comonomer content (mol %), preferably wherein the alpha-olefin comonomer having from 4 to 10 carbon atoms of ethylene polymer component (A) is different from the alpha-olefin comonomer having from 4 to 10 carbon atoms of ethylene polymer component (B), preferably wherein the alpha-olefin comonomer having from 4 to 10 carbon atoms of ethylene polymer component (A) is 1-butene and the alpha-olefin comonomer having from 4 to 10 carbon atoms of ethylene polymer component (B) is 1-hexene.

As stated above the comonomer type for the polymer fractions (A-1) and (A-2) is the same, thus the same alpha-olefin comonomer having from 4 to 10 carbon atoms is used for fraction (A-1) and (A-2), more preferably both fractions therefore have 1-butene as comonomer.

Preferably, the ratio of the amount (mol %) of alpha-olefin comonomer having from 4 to 10 carbon atoms comonomer present in ethylene polymer component (A) to the amount (mol %) of at least two alpha-olefin comonomers having from 4 to 10 carbon atoms of the final multimodal polymer of ethylene (1) is of 0.1 to 0.6, preferably of 0.1 to 0.4, more preferably the ethylene polymer component (A) has lower amount (mol %) of comonomer than the ethylene polymer component (B).

The comonomer content of component (A) and (B) can be measured, or, in case, and preferably, one of the components is produced first and the other thereafter in the presence of the first produced in so called multistage process, then the comonomer content of the first produced component, e.g. component (A), can be measured and the comonomer content of the other component, e.g. component (B), can be calculated according to following formula:

Comonomer content (mol %) in component B=(comonomer content (mol %) in final product−(weight fraction of component A* comonomer content (mol %) in component A))/(weight fraction of component B)

More preferably, the total amount of comonomers present in the multimodal polymer of ethylene is of 0.5 to 10 mol %, preferably of 1.0 to 8 mol %, more preferably of 1.0 to 5 mol %, more preferably of 1.5 to 5.0 mol %.

Preferably, the total amount (mol %) of alpha-olefin comonomer having from 4 to 10 carbon atoms present in the ethylene polymer component (A) is of 0.03 to 5.0 mol %, preferably of 0.05 to 4.0 mol %, more preferably of 0.1 to 3.0 mol %, even more preferably of 0.1 to 2.0 mol %, more preferably of 0.15 to 1.5 mol %, even more preferably of 0.15 to 1.0 mol %.

The further specific multimodality, i.e. the difference between, the comonomer type and comonomer content between the ethylene polymer components (A) and (B), respectively the difference in the comonomer content in the ethylene polymer fractions (A-1) and (A-2) further contributes to highly advantageous optical properties, like haze and/or gloss.

Even more preferably the multimodal polymer of ethylene of the invention is further multimodal with respect to difference in density between the ethylene polymer component (A) and ethylene polymer component (B). Preferably, the density of ethylene polymer component (A) is different, preferably higher, than the density of the ethylene polymer component (B). More preferably, the density of the ethylene polymer component (A) is of 925 to 950, preferably of 930 to 945 $kg/m^3$ and/or the ethylene polymer component (B) is of 880 to <910, preferably of 890 to 905 $kg/m^3$.

The multimodal polymer of ethylene is preferably a linear low density polyethylene (LLDPE) which has a well known meaning. Even more preferably, the density of the multimodal polymer of ethylene is of 910 to 935, preferably of 912 to 925 kg/m$^3$.

The multimodality with respect to density further contributes to the beneficial mechanical properties of the polymer composition.

Additionally, the multimodal polymer of ethylene can also be multimodal with respect to, i.e. have difference between, the (weight average) molecular weight of the ethylene polymer components, respectively fractions (A), (A-1), (A-2) and (B). The multimodality re weight average molecular weight means that the form of the molecular weight distribution curve, i.e. the appearance of the graph of the polymer weight fraction as function of its molecular weight, of such a multimodal polyethylene will show two or more maxima or at least be distinctly broadened in comparison with the curves for the individual components.

More preferably the multimodal polymer of ethylene is multimodal at least with respect to, i.e. has a difference between, the MFR$_2$, the comonomer type and the comonomer content (mol %), as well as with respect to, i.e. has a difference between, the density of the ethylene polymer components, respectively fractions (A), (A-1), (A-2) and (B), as defined above, below or in the claims including any of the preferable ranges or embodiments of the polymer composition.

Most preferably the multimodal polymer of ethylene of the invention, as defined above, below or in claims, comprises, preferably consisting of, ethylene polymer components (A) and (B), wherein the ethylene polymer component (A) comprises, preferably consisting of, ethylene polymer fraction (A-1) and (A-2)

the ethylene polymer component (A) and/or the ethylene polymer fraction (A-2) has higher MFR$_2$ than ethylene polymer component (B);

more preferably, the ethylene polymer component (A) has a MFR$_2$ of >1.0 to 50 g/10 min, preferably of 1.5 to 40, more preferably of 2.0 to 30, more preferably of 2.5 to 20, more preferably of 3.0 to 15, even preferably of 3.5 to 10.0 g/10 min and/or the ethylene polymer fraction (A-2) has a MFR$_2$ of >10.0 to 150.0 g/10 min, preferably of 12.0 to 130 g/10 min more preferably of 15.0 to 120 g/10 min;

even more preferably, the ratio of the MFR$_2$ of ethylene polymer fraction (A-2) to the MFR$_2$ of the final multimodal polymer of ethylene is of 14 to 130, preferably of 15 to 120, preferably of 50 to 110, more preferably of 55 to 90;

and wherein the ethylene polymer components (A), respectively fractions (A-1) and/or (A-2) have a different comonomer than the ethylene polymer (B);

more preferably, the ethylene polymer fractions (A-1) and (A-2) and the ethylene polymer component (A) have a lower amount (mol %) of comonomer than the ethylene polymer component (B), even more preferably, the ratio of [the amount (mol %) of alpha-olefin comonomer having from 4 to 10 carbon atoms comonomer present in ethylene polymer component (A)] to [the amount (mol %) of at least two alpha-olefin comonomers having from 4 to 10 carbon atoms of the final multimodal polymer of ethylene (1) is of 0.1 to 0.6, preferably of 0.1 to 0.4;

even more preferably, wherein the alpha-olefin comonomer having from 4 to 10 carbon atoms of ethylene polymer component (A), and thus of ethylene polymer fractions (A-1) and (A-2), is 1-butene and the alpha-olefin comonomer having from 4 to 10 carbon atoms of ethylene polymer component (B) is 1-hexene;

and wherein the ethylene polymer fractions (A-1) and (A-2), as well as ethylene polymer component (A), have different, preferably higher, density than the density of the ethylene polymer component (B);

more preferably density of the multimodal polymer of ethylene, is of 910 to 935 kg/m$^3$, preferably of 912 to 925 kg/m$^3$;

even more preferably the density of the ethylene polymer fractions (A-1) and/or (A-2), as well as of polymer component (A) is of 920 to 960 kg/m$^3$, preferably of 925 to 965 kg/m$^3$, further preferred 925 to 955 kg/m$^3$, and the density of the ethylene polymer fractions (A-1) and (A-2) are different by 5 kg/m$^3$ up to 35 kg/m$^3$' preferably by 5 kg/m$^3$ up to 30 kg/m$^3$.

In an embodiment, the multimodal polymer of ethylene may have a haze (measured on 40 μm blown films according to ASTM D 1003-00) of below 32%, preferably between 15 and 30%, further preferred between >15% and <30%, even further preferred between >16% and <28% and/or a gloss (measured on 40 μm blown films at an angle of 45° in MD according to ASTM D2457) of above 20%, preferably between 25% and 60%, further preferred between 30% and In another embodiment, the multimodal polymer of ethylene may have a dart-drop impact strength (DDI) determined according to ASTM D1709, method A on a 40 μm multilayer blown film of at least 350 g up to 2500 g, more preferably in the range of 400 to 2200 g, and still more preferably in the range of 500 to 2000 g, like in the range of 550 to 1800 g.

In a further embodiment, the multimodal polymer of ethylene may have a tensile modulus determined according to ISO 527 at 23° C. on films with a thickness of 40 μm in machine direction as well as in transverse direction in the range of from 100 to 500 MPa, preferably of from 120 to 400 MPa, and more preferably of from 150 to 300 MPa.

Preferably, the multimodal polymer of ethylene comprises the ethylene polymer component (A) in an amount of 25 to 70 wt %, preferably of 30 to 60 wt %, more preferably of 32 to 55 wt %, more preferably 34 to 50 wt % and the ethylene polymer component (B) in an amount of 75 to 30 wt %, preferably of 70 to 40 wt %, more preferably of 45 to 68 wt %, more preferably 50 to 66 wt %, based on the total amount (100 wt %) of the multimodal polymer of ethylene. Most preferably, the multimodal polymer of ethylene consists of the ethylene polymer components (A) and (B) as the sole polymer components. Accordingly, the split between ethylene polymer component (A) to ethylene polymer component (B) is of (25 to 70):(75 to 30) preferably of (30 to 60):(70 to 40), more preferably of (32 to 55):(68 to 45), even more preferably of (34 to 50):(50 to 66) wt %.

In an embodiment, the multimodal polymer of ethylene comprises each of the ethylene polymer fraction (A-1) as well as fraction (A-2) in an amount of 15 to 30 wt %, preferably 15 to 25 wt %. The split between ethylene polymer fraction (A-1) and (A-2) is (30 to 70):(70-30), preferably (40 to 60):(60-40), more preferably (45 to 55):(55-45) and even more preferably (48 to 52):(52-48).

The multimodal polymer of ethylene may contain further polymer components and optionally additives and/or fillers. It is noted herein that additives may be present in the multimodal polymer of ethylene and/or mixed with the multimodal polymer of ethylene e.g. in a compounding step for producing a polymer composition comprising the multimodal polymer of ethylene and a further polymer, like a LDPE. In case the multimodal polymer of ethylene is combined with further polymer components, then the amount of the further polymer component(s) typically varies between 3 to 20 wt % based on the combined amount of the multimodal polymer of ethylene and the other polymer component(s).

The optional additives and fillers and the used amounts thereof are conventional in the field of film applications. Examples of such additives are, among others, antioxidants, process stabilizers, UV-stabilizers, pigments, fillers, anti-static additives, antiblock agents, nucleating agents, acid scavengers as well as polymer processing agent (PPA).

It is understood herein that any of the additives and/or fillers can optionally be added in so called master batch which comprises the respective additive(s) together with a carrier polymer. In such case the carrier polymer is not calculated to the multimodal polymer of ethylene, respectively to the polymer components of a polymer composition, but to the amount of the respective additive(s), based on the total amount of polymer composition (100 wt %).

If the multimodal polymer of ethylene is combined with further polymer component(s) to yield a polymer composition, the polymer composition preferably comprises at least 80 wt % of multimodal polymer of ethylene and maximum 20 wt % of further polymer component(s), based on the total amount (100 wt %) of the polymer composition and optionally, and preferably, additives.

In an embodiment, the amount of multimodal polymer may be preferably between 85.0 and 99.0 wt %, more preferably in the range of from >85.0 and 95.0 wt % and thus the amount of further polymer component(s) may preferably be between 1.0 and 15.0 wt %, preferably between 5.0 and <15.0 wt %.

In one embodiment, the further polymer component is a low density polyethylene (LDPE), preferably a low density polyethylene produced in a high pressure process.

The LDPE preferably has a density in the range of 910 to 940 kg/m$^3$, more preferably in the range of 915 to 935 kg/m$^3$, still more preferably in the range of 918 to 930 kg/m$^3$.

Further it is preferred that the LDPE has a melt flow rate MFR$_2$ (190° C., 2.16 kg) in the range of from 0.05 to 2.0 g/10 min, more preferably in the range of from 0.10 to 1.8 g/10 min, and even more preferably in the range of from 0.15 to 1.5 g/10 min.

Accordingly, one example of such a low density polyethylene (LDPE) is the commercial product FT5230 of Borealis AG (MFR$_2$: 0.75 g/10 min; Density: 923 kg/m$^3$)

It is noted herein, that the multimodal polymer of ethylene may optionally comprise a prepolymer component in an amount up to 10 wt %, preferably up to 5 wt %, which has a well-known meaning in the art. In such case, the prepolymer component is calculated in one of the ethylene polymer components (A) or (B), respectively to one of the ethylene polymer fractions (A-1) and (A-2), preferably in the ethylene polymer fraction (A-1).

Accordingly, the multimodal polymer of ethylene is preferably produced using a coordination catalyst. More preferably, the ethylene polymer components (A) and (B), and thus ethylene polymer fractions (A-1) and (A-2) are preferably produced using a single site catalyst, which includes metallocene catalyst and non-metallocene catalyst, which all terms have a well-known meaning in the art. The term "single site catalyst" means herein the catalytically active metallocene compound or complex combined with a cocatalyst. The metallocene compound or complex is referred herein also as organometallic compound (C).

The organometallic compound (C) comprises a transition metal (M) of Group 3 to 10 of the Periodic Table (IUPAC 2007) or of an actinide or lanthanide.

The term "an organometallic compound (C)" in accordance with the present invention includes any metallocene or non-metallocene compound of a transition metal which bears at least one organic (coordination) ligand and exhibits the catalytic activity alone or together with a cocatalyst. The transition metal compounds are well known in the art and the present invention covers compounds of metals from Group 3 to 10, e.g. Group 3 to 7, or 3 to 6, such as Group 4 to 6 of the Periodic Table, (IUPAC 2007), as well lanthanides or actinides.

In an embodiment the organometallic compound (C) has the following formula (I):

$$(L)_m R_n MX_q \qquad (I)$$

wherein

"M" is a transition metal (M) transition metal (M) of Group 3 to 10 of the Periodic Table (IUPAC 2007), each "X" is independently a monoanionic ligand, such as a σ-ligand, each "L" is independently an organic ligand which coordinates to the transition metal "M", "R" is a bridging group linking said organic ligands (L), "m" is 1, 2 or 3, preferably 2

"n" is 0, 1 or 2, preferably 1,

"q" is 1, 2 or 3, preferably 2 and m+q is equal to the valency of the transition metal (M).

"M" is preferably selected from the group consisting of zirconium (Zr), hafnium (Hf), or titanium (Ti), more preferably selected from the group consisting of zirconium (Zr) and hafnium (Hf). "X" is preferably a halogen, most preferably Cl.

Most preferably the organometallic compound (C) is a metallocene complex which comprises a transition metal compound, as defined above, which contains a cyclopentadienyl, indenyl or fluorenyl ligand as the substituent "L". Further, the ligands "L" may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Most preferred single site catalyst is a metallocene catalyst which means the catalytically active metallocene complex, as defined above, together with a cocatalyst, which is also known as an activator. Suitable activators are metal alkyl compounds and especially aluminium alkyl compounds known in the art. Especially suitable activators used with metallocene catalysts are alkylaluminium oxy-compounds, such as methylalumoxane (MAO), tetraisobutylalumoxane (TIBAO) or hexaisobutylalumoxane (HIBAO).

More preferably the ethylene polymer component (A), including ethylene polymer fractions (A-1) and (A-2), and ethylene polymer component (B) of the multimodal polymer of ethylene are produced using, i.e. in the presence of, the same metallocene catalyst.

In an embodiment, the multimodal polymer of ethylene may thereby have an Mw/Mn between 4.5 and <6.0, preferably between 4.6 and 5.7, and more preferably between 4.7 and 5.6.

The multimodal polymer of ethylene may be produced in any suitable polymerization process known in the art. The ethylene polymer fraction (A-1) is preferably produced in a first polymerization zone, the ethylene polymer fraction (A-2) is produced in a second polymerization zone and the ethylene polymer component (B) is produced in a third polymerization zone. The first, second and third polymerization zones may be connected in any order, i.e. the first polymerization zone may precede the second polymerization zone, or the second polymerization zone may precede the first polymerization zone or, alternatively, polymerization zones may be connected in parallel. However, it is preferred to operate the polymerization zones in cascaded mode. The polymerization zones may operate in slurry, solution, or gas phase conditions or their combinations. Suitable processes comprising cascaded slurry and gas phase polymerization stages are disclosed, among others, in WO-A-92/12182 and WO-A-96/18662.

It is often preferred to remove the reactants of the preceding polymerization stage from the polymer before introducing it into the subsequent polymerization stage. This is preferably done when transferring the polymer from one polymerization stage to another.

The catalyst may be transferred into the polymerization zone by any means known in the art. For example, it is possible to suspend the catalyst in a diluent and maintain it as homogeneous slurry, to mix the catalyst with a viscous mixture of grease and oil and feed the resultant paste into the polymerization zone or to let the catalyst settle and introduce portions of thus obtained catalyst mud into the polymerization zone.

The polymerization of the ethylene polymer fractions (A-1) and (A-2), in the first and second polymerization zones is preferably conducted in slurry. Then the polymer particles formed in the polymerization, together with the catalyst fragmented and dispersed within the particles, are suspended in the fluid hydrocarbon. The slurry is agitated to enable the transfer of reactants from the fluid into the particles.

The polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons and preferred diluent is propane.

The ethylene content in the fluid phase of the slurry may be from 2 to about 50% by mole, preferably from about 2 to about 20% by mole and in particular from about 3 to about 12% by mole.

The temperature in the slurry polymerization is typically from 50 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

It is sometimes advantageous to conduct the slurry polymerization above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The slurry may be withdrawn from the reactor either continuously or intermittently. A preferred way of intermittent withdrawal is the use of settling legs where slurry is allowed to concentrate before withdrawing a batch of the concentrated slurry from the reactor. The continuous withdrawal is advantageously combined with a suitable concentration method, e.g. as disclosed in EP-A-1310295 and EP-A-1591460.

Hydrogen may be fed into the reactor to control the molecular weight of the polymer as known in the art. Furthermore, one or more alpha-olefin comonomers are added into the reactor e.g. to control the density of the polymer product. The actual amount of such hydrogen and comonomer feeds depends on the catalyst that is used and the desired melt index (or molecular weight) and density (or comonomer content) of the resulting polymer.

The polymerization, preferably of the ethylene polymer component (B), in the third polymerization zone is preferably conducted in gas phase, preferably in a fluidized bed reactor, in a fast fluidized bed reactor or in a settled bed reactor or in any combination of these. The polymerization in the third polymerization zone is more preferably conducted in a fluidized bed gas phase reactor, wherein ethylene is polymerized together with at least one comonomer in the presence of a polymerization catalyst and, preferably in the presence of the reaction mixture from the first and second polymerization zone comprising the ethylene polymer fractions (A-1) and (A-2) in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. One or more of the above-mentioned components may be continuously added into the fluidization gas to compensate for losses caused, among other, by reaction or product withdrawal.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Where the gas phase reactor is a part of a reactor cascade the catalyst is usually dispersed within the polymer particles from the preceding polymerization stage. The polymer particles may be introduced into the gas phase reactor as disclosed in EP-A-1415999 and WO-A-00/26258. Especially if the preceding reactor is a slurry reactor it is advantageous to feed the slurry directly into the fluidized bed of the gas phase reactor as disclosed in EP-A-887379, EP-A-887380, EP-A-887381 and EP-A-991684.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

Also antistatic agent(s), such as water, ketones, aldehydes and alcohols, may be introduced into the gas phase reactor if needed. The reactor may also include a mechanical agitator to further facilitate mixing within the fluidized bed.

Typically the fluidized bed polymerization reactor is operated at a temperature within the range of from 50 to 100° C., preferably from 65 to 90° C. The pressure is suitably from 10 to 40 bar, preferably from 15 to 30 bar.

The polymerization of ethylene polymer fractions (A-1), (A-2) and ethylene polymer component (B) in the first, second and third polymerization zones may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step may be conducted in slurry or in gas phase. Preferably, prepolymerization is conducted in slurry, preferably in a loop reactor. The prepolymerization is then preferably conducted in an inert diluent, preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 40 to 70° C.

The pressure is not critical and is typically from 1 to 150 bar, preferably from 10 to 100 bar. The catalyst components are preferably all introduced to the prepolymerization step. Preferably the reaction product of the prepolymerization step is then introduced to the first polymerization zone. Also preferably, as mentioned above, the prepolymer component is calculated to the amount of the ethylene polymer fraction (A-1).

It is within the knowledge of a skilled person to adapt the polymerization conditions in each step as well as feed streams and resident times to obtain the claimed multimodal polymer of ethylene.

The multimodal polymer of ethylene comprising at least, and preferably solely, the ethylene polymer component (A), including ethylene polymer fractions (A-1) and (A-2), and ethylene polymer component (B) which is obtained from the third polymerization zone, which is preferably a gas phase reactor as described above, is the subjected to conventional post reactor treatment to remove i.a. the unreacted components.

Thereafter, typically, the obtained polymer is extruded and pelletized. The extrusion may be conducted in the manner generally known in the art, preferably in a twin screw extruder. One example of suitable twin screw extruders is a co-rotating twin screw extruder. Those are manufactured, among others, by Coperion or Japan Steel Works. Another example is a counter-rotating twin screw extruder. Such extruders are manufactured, among others, by Kobe Steel and Japan Steel Works. Before the extrusion at least part of the desired additives, as mentioned above, are preferably mixed with the polymer. The extruders typically include a melting section where the polymer is melted and a mixing section where the polymer melt is homogenised. Melting and homogenisation are achieved by introducing energy into the polymer. Suitable level of specific energy input (SEI) is from about 150 to about 450 kWh/ton polymer, preferably from 175 to 350 kWh/ton.

Film of the Invention

The film of the invention comprises at least one layer comprising the multimodal polymer of ethylene or a polymer composition as described above. The film can be a monolayer film or a multilayer film, wherein at least one layer comprises multimodal polymer of ethylene or a polymer composition as described above. The terms "monolayer film" and multilayer film" have well known meanings in the art.

The layer of the monolayer or multilayer film of the invention may consist of the multimodal polymer of ethylene or a polymer composition as described above as such or of a blend together with further polymer(s). In case of blends, any further polymer is different from the multimodal polymer of ethylene and is preferably a polyolefin. Part of the above mentioned additives, like processing aids, can optionally added to the polymer composition during the film preparation process.

Preferably, the at least one layer of the invention comprises at least 50 wt %, preferably at least 60 wt %, preferably at least 70 wt %, more preferably at least 80 wt %, of the multimodal polymer of ethylene or a polymer composition as described above. More preferably said at least one layer of the film of invention consists of the multimodal polymer of ethylene or a polymer composition as described above.

Accordingly, the films of the present invention may comprise a single layer (i.e. monolayer) or may be multi-layered. Multilayer films typically, and preferably, comprise at least 3 layers.

The films are preferably produced by any conventional film extrusion procedure known in the art including cast film and blown film extrusion. Most preferably, the film is a blown or cast film. E.g. the blown film is produced by extrusion through an annular die and blowing into a tubular film by forming a bubble which is collapsed between nip rollers after solidification. This film can then be slit, cut or converted (e.g. gusseted) as desired. Conventional film production techniques may be used in this regard. If the preferable blown or cast film is a multilayer film then the various layers are typically coextruded. The skilled man will be aware of suitable extrusion conditions.

The resulting films may have any thickness conventional in the art. The thickness of the film is not critical and depends on the end use. Thus, films may have a thickness of, for example, 300 µm or less, typically 6 to 200 µm, preferably 10 to 180 µm, e.g. 20 to 150 µm or 20 to 120 µm. If desired, the polymer of the invention enables thicknesses of less than 100 µm, e.g. less than 50 µm. Films of the invention with thickness even less than 20 µm can also be produced whilst maintaining good mechanical properties.

Determination Methods

Unless otherwise stated in the description or in the experimental part, the following methods were used for the property determinations of the polymers (including its fractions and components) and/or any sample preparations thereof as specified in the text or experimental part.

Melt Flow Rate

The melt flow rate (MFR) was determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene. MFR may be determined at different loadings such as 2.16 kg ($MFR_2$), 5 kg ($MFR_5$) or 21.6 kg (MFR21).

Density

Density of the polymer was measured according to ASTM; D792, Method B (density by balance at 23° C.) on compression moulded specimen prepared according to EN ISO 1872-2 (February 2007) and is given in kg/m$^3$.

Molecular Weights, Molecular Weight Distribution (Mn, Mw, MWD)—GPC

A PL 220 (Agilent) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Agilent as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 µL of sample solution were injected per analysis. All samples were prepared by dissolving 8.0-12.0 mg of polymer in 10 mL (at 160° C.) of stabilized TCB (same as mobile phase) for 2.5 hours for PP or 3 hours for PE at 160° C. under continuous gentle shaking. The injected concentration of the polymer solution at 160° C. ($c_{160° C.}$) was determined in the following way.

$$c_{160° C.} = \frac{w_{25}}{V_{25}} * 0.8772$$

With: $w_{25}$ (polymer weight) and $V_{25}$ (Volume of TCB at 25° C.).

The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 cm$^3$/g. The calculation was performed using the Cirrus Multi-Offline SEC-Software Version 3.2 (Agilent).

The molar mass at each elution slice was calculated by using the 15° light scattering angle. Data collection, data processing and calculation were performed using the Cirrus Multi SEC-Software Version 3.2. The molecular weight was calculated using the option in the Cirrus software "use LS 15 angle" in the field "sample calculation options subfield slice MW data from". The dn/dc used for the determination of molecular weight was calculated from the detector constant of the RI detector, the concentration c of the sample and the area of the detector response of the analysed sample.

This molecular weight at each slice is calculated in the manner as it is described by C. Jackson and H. G. Barth (C. Jackson and H. G. Barth, "Molecular Weight Sensitive Detectors" in: Handbook of Size Exclusion Chromatography and related techniques, C.-S. Wu, 2$^{nd}$ ed., Marcel Dekker, New York, 2004, p. 103) at low angle. For the low and high molecular region in which less signal of the LS detector or RI detector respectively was achieved a linear fit was used to correlate the elution volume to the corresponding molecular weight. Depending on the sample the region of the linear fit was adjusted.

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\sum (A_i/M_i)} \tag{1}$$

$$M_w = \frac{\sum_{i=1}^{N} (A_i \times M_i)}{\sum A_i} \tag{2}$$

$$M_z = \frac{\sum_{i=1}^{N} (A_i \times M_i^2)}{\sum (A_i/M_i)} \tag{3}$$

For a constant elution volume interval $\Delta V_i$, where $A_i$ and $M_i$ are the chromatographic peak slice area and polyolefin molecular weight (MW) determined by GPC-LS.

Comonomer Contents:

Quantification of Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification.{klimke06, parkinson07, castignolles09} Standard single-pulse excitation was employed utilising the NOE at short recycle delays{pollard04, klimke06} and the RS-HEPT decoupling scheme{fillip05, griffin07}. A total of 1024 (1k) transients were acquired per spectra. Quantitative $^{13}C\{^1H\}$ NMR spectra were processed, integrated and relevant quantitative properties determined from the integrals. All chemical shifts are internally referenced to the bulk methylene signal (8+) at 30.00 ppm.

The amount of ethylene was quantified using the integral of the methylene ($\delta$+) sites at 30.00 ppm accounting for the number of reporting sites per monomer:

$$E=I_{\delta+}/2$$

the presence of isolated comonomer units is corrected for based on the number of isolated comonomer units present:

$$Etotal=E+(3*B+2*H)/2$$

where B and H are defined for their respective comonomers. Correction for consecutive and non-consecutive commoner incorporation, when present, is undertaken in a similar way.

Characteristic signals corresponding to the incorporation of 1-butene were observed and the comonomer fraction calculated as the fraction of 1-butene in the polymer with respect to all monomer in the polymer:

$$fBtotal=(Btotal/(Etotal+Btotal+Htotal)$$

The amount isolated 1-butene incorporated in EEBEE sequences was quantified using the integral of the $_*B2$ sites at 38.3 ppm accounting for the number of reporting sites per comonomer:

$$B=I_{*B2}$$

The amount consecutively incorporated 1-butene in EEBBEE sequences was quantified using the integral of the $\alpha\alpha B2B2$ site at 39.4 ppm accounting for the number of reporting sites per comonomer:

$$BB=2*I\alpha\alpha B2B2$$

The amount non consecutively incorporated 1-butene in EEBEBEE sequences was quantified using the integral of the $\beta\beta B2B2$ site at 24.7 ppm accounting for the number of reporting sites per comonomer:

$$BEB=2*I\beta\beta B2B2$$

Due to the overlap of the $*B2$ and $*\beta B2B2$ sites of isolated (EEBEE) and non-consecutively incorporated (EEBEBEE) 1-butene respectively the total amount of isolated 1-butene incorporation is corrected based on the amount of non-consecutive 1-butene present:

$$B=I_{*B2}-2*I_{\beta\beta B2B2}$$

The total 1-butene content was calculated based on the sum of isolated, consecutive and non consecutively incorporated 1-butene:

$$Btotal=B+BB+BEB$$

The total mole fraction of 1-butene in the polymer was then calculated as:

$$fB=(Btotal/(Etotal+Btotal+Htotal)$$

Characteristic signals corresponding to the incorporation of 1-hexene were observed and the comonomer fraction calculated as the fraction of 1-hexene in the polymer with respect to all monomer in the polymer:

$$fHtotal=(Htotal/(Etotal+Btotal+Htotal)$$

The amount isolated 1-hexene incorporated in EEHEE sequences was quantified using the integral of the $*B4$ sites at 39.9 ppm accounting for the number of reporting sites per comonomer:

$$H=I_{*B4}$$

The amount consecutively incorporated 1-hexene in EEHHEE sequences was quantified using the integral of the $\alpha\alpha B4B4$ site at 40.5 ppm accounting for the number of reporting sites per comonomer:

$$HH=2*I\alpha\alpha B4B4$$

The amount non consecutively incorporated 1-hexene in EEHEHEE sequences was quantified using the integral of the $\beta\beta B4B4$ site at 24.7 ppm accounting for the number of reporting sites per comonomer:

$$HEH=2*I\beta\beta B4B4$$

The total mole fraction of 1-hexene in the polymer was then calculated as:

$$fH=(Htotal/(Etotal+Btotal+Htotal)$$

The mole percent comonomer incorporation is calculated from the mole fraction:

$$B[mol \%]=100*fB$$

$$H[mol \%]=100*fH$$

The weight percent comonomer incorporation is calculated from the mole fraction:

$$B[wt \%]=100*(fB*56.11)/((fB*56.11)+(fH*84.16)+((1-(fB+fH))*28.05))$$

$$H[wt \%]=100*(fH*84.16)/((fB*56.11)+(fH*84.16)+((1-(fB+fH))*28.05))$$

REFERENCES

Klimke, K., Parkinson, M., Piel, C., Kaminsky, W., Spiess, H. W., Wilhelm, M., Macromol. Chem. Phys. 2006; 207:382.

Parkinson, M., Klimke, K., Spiess, H. W., Wilhelm, M., Macromol. Chem. Phys. 2007; 208:2128.

Pollard, M., Klimke, K., Graf, R., Spiess, H. W., Wilhelm, M., Sperber, O., Piel, C., Kaminsky, W., Macromolecules 2004; 37:813.

Filip, X., Tripon, C., Filip, C., J. Mag. Resn. 2005, 176, 239

Griffin, J. M., Tripon, C., Samoson, A., Filip, C., and Brown, S. P., Mag. Res. in Chem. 2007 45, S1, S198

Castignolles, P., Graf, R., Parkinson, M., Wilhelm, M., Gaborieau, M., Polymer 50 (2009) 2373 Busico, V., Cipullo, R., Prog. Polym. Sci. 26 (2001) 443

Busico, V., Cipullo, R., Monaco, G., Vacatello, M., Segre, A. L., Macromoleucles 30 (1997) 6251 Zhou, Z., Kuemmerle, R., Qiu, X., Redwine, D., Cong, R., Taha, A., Baugh, D. Winniford, B., J. Mag. Reson. 187 (2007) 225

Busico, V., Carbonniere, P., Cipullo, R., Pellecchia, R., Severn, J., Talarico, G., Macromol. Rapid Commun. 2007, 28, 1128

Resconi, L., Cavallo, L., Fait, A., Piemontesi, F., Chem. Rev. 2000, 100, 1253

Haze

Haze was determined according to ASTM D 1003-00 on films as produced indicated below.

Gloss

Gloss was determined according to ASTM D2457 at an angle of 45° (in MD) on films as produced indicated below. Conditioning time: >96 h/Test temperature: 23° C.

Tensile Modulus

Tensile modulus in machine and transverse direction were determined according to ISO 527-3 at 23° C. on the films as produced indicated below. Testing was performed at a cross head speed of 1 mm/min.

Dart Drop Strength (DDI)

Dart-drop was measured using ASTM D1709, method A (Alternative Testing Technique) from the films as produced indicated below. A dart with a 38 mm diameter hemispherical head was dropped from a height of 0.66 m onto a multilayer film clamped over a hole. Successive sets of twenty specimens were tested. One weight was used for each set and the weight was increased (or decreased) from set to set by uniform increments. The weight resulting in failure of 50% of the specimens was calculated and reported.

Experimental Part

Preparation of Examples

Cat.Example: Catalyst Preparation 130 grams of a metallocene complex bis(1-methyl-3-n-butylcyclopentadienyl) zirconium (IV) dichloride (CAS no. 151840-68-5), and 9.67 kg of a 30% solution of commercial methylalumoxane (MAO) in toluene were combined and 3.18 kg dry, purified toluene was added. The thus obtained complex solution was added onto 17 kg silica carrier Sylopol 55 SJ (supplied by Grace) by very slow uniform spraying over 2 hours. The temperature was kept below 30° C. The mixture was allowed to react for 3 hours after complex addition at 30° C.

Polymerization: Inventive Example 1: Inventive Multimodal Polymer of Ethylene with 1-Butene and 1-Hexene Comonomers Borstar pilot plant with a 3-reactor set-up (loop1-loop2-GPR 1) and a prepolymerization loop reactor.

Prepolymerization: A loop reactor having a volume of 50 dm$^3$ was operated at a temperature of 50° C. and a pressure of 5.7 MPa.

Furthermore, a first loop reactor having a volume of 150 dm$^3$ was operated at 85° C. temperature and 5.5 MPa. A second loop reactor with a volume of 350 dm$^3$ was operated at 85° C. and 5.4 MPa.

From there the polymer was directed to a flash vessel operated at 300 kPa and then a gas phase reactor (GPR) operated at a pressure of 2.0 MPa and a temperature of 75° C.

Polymerization conditions and material properties were as recited in the tables below.

The polymer was mixed with 2400 ppm of Irganox B561. Then it was compounded and extruded under nitrogen atmosphere to pellets by using a CIMP90 extruder so that the SEI was 230 kWh/kg and the melt temperature 250° C. (polymer of example 1)

The inventive polymers of example 2 and example 3 as well as of the comparative example were produced as the inventive example 1, but using the polymerization conditions as given in table 1.

Film Sample Preparation

The test films consisting of the inventive polymer compositions (final polymer composition), inventive blend compositions and respective comparative or reference polymer compositions of 40 μm thickness, were prepared using a Collin 30 lab scale mono layer blown film line. This line has a screw diameter of 25 millimeters (mm), L/D of 25, a die diameter of 60 mm, a die gap of 1.5 mm. The film samples were produced at 190° C. with an average thickness of 40 μm, with a 1:3 blow-up ratio, frostline distance of 120 mm. Melt temperature 194° C.

TABLE 1

| Polymerization conditions | | | | | |
|---|---|---|---|---|---|
| | IE1 | IE2 | IE3 | IE4 | CE |
| Prepoly reactor | | | | | |
| Catalyst feed (g/h) | 28.99 | 27.26 | 27.33 | 36.99 | 27.36 |
| H2 (g/h) | 0.20 | 0.20 | 0.20 | 0.20 | 0.20 |
| C4 (g/h) | 100 | 100 | 100 | 100 | 100 |
| loop 1 | | | | | |
| C2 conc. (mol %) | 3.73 | 2.93 | 2.80 | 3.49 | 2.67 |
| H2/C2 ratio (mol/kmol) | 0.48 | 0.59 | 0.57 | 0.41 | 0.34 |
| C4/C2 ratio (mol/kmol) | 24.5 | 152.0 | 171.2 | 13.8 | 66.5 |
| Split (%) | 18.8 | 19.4 | 17.8 | 17.1 | 19.7 |
| MFR2 (g/10 min) of loop 1 material | 0.4 | 0.8 | 0.6 | 0.2 | 2.1 |
| Density (kg/m3) of loop 1 material | 937 | 927 | 926 | 940 | 938 |
| loop 2 | | | | | |
| C2 conc. (mol %) | 2.99 | 2.84 | 2.62 | 2.65 | 2.36 |
| H2/C2 ratio (mol/kmol) | 0.33 | 0.31 | 0.44 | 0.39 | 0.25 |
| C4/C2 ratio (mol/kmol) | 152.3 | 74.9 | 82.0 | 181.4 | 113.4 |
| Split (%) | 20.5 | 19.4 | 17.8 | 17.8 | 19.9 |
| MFR2 (g/10 min) after loop 2 | 6.6 | 4.2 | 8.2 | 5.6 | 7.0 |
| Density (kg/m3) after loop 2 | 942 | 940 | 940 | 943 | 941 |
| MFR2 (g/10 min) of loop 2 material | 72.3 | 19.1 | 96.7 | 97.3 | 20.4 |
| Density (kg/m3) of loop 1 material | 947 | 952 | 954 | 947 | 943 |
| A3 GPR | | | | | |
| C2 partial Press. (kPa) | 764.8 | 747.5 | 989.1 | 646.0 | 632.0 |
| H2/C2 ratio (mol/kmol) | 0.18 | 0.15 | 0.11 | 0.19 | 0.18 |
| C6/C2 ratio (mol/kmol) | 29.4 | 30.1 | 31.8 | 36.0 | 32.9 |
| C4/C2 ratio (mol/kmol) | 0.00 | 0.00 | 0.00 | 0.00 | 0.00 |
| Split (%) | 58.2 | 58.7 | 61.8 | 62.7 | 57.6 |
| MFR2 (g/10 min) of GPR material | 0.3 | 0.5 | 0.3 | 0.5 | 0.6 |
| Density (kg/m3) of GPR material | 905 | 903 | 901 | 896 | 901 |

TABLE 2

| Material properties | | | | | |
|---|---|---|---|---|---|
| Material | IE1 | IE2 | IE3 | IE4 | CE |
| MFR2 (g/10 min) | 1.2 | 1.2 | 1.0 | 1.2 | 1.7 |
| MFR21.6 (g/10 min) | 24.3 | 25.7 | 20.3 | 27.1 | 35.7 |
| MFR21/MFR2 | 21.1 | 21.4 | 20.7 | 22.2 | 20.9 |
| Mn | 20400 | 20050 | 20100 | 18200 | 21750 |
| Mw | 100500 | 98350 | 104000 | 99500 | 91400 |
| Mz | 202500 | 198500 | 209500 | 209000 | 178500 |
| Mw/Mn | 4.9 | 4.9 | 5.2 | 5.5 | 4.2 |
| Density (kg/m3) | 920 | 918 | 916 | 914 | 918 |
| C4 (mol %) | 0.2 | 0.3 | 0.2 | 0.2 | 0.2 |
| C6 (mol %) | 2.5 | 2.6 | 2.9 | 3.4 | 2.8 |
| DDI [g] | 559 | 893 | 1617 | 925 | 756 |
| Tensile MD [MPa] | 210 | 198 | 176 | 181 | 250 |

TABLE 3

| Film properties | | | | | |
| --- | --- | --- | --- | --- | --- |
| | IE1 | IE2 | IE3 | IE4 | CE |
| Gloss 45° (%) | 37.4 | 45.8 | 33.7 | 46.1 | 17.9 |
| Haze (%) | 26.1 | 23 | 20.1 | 18.8 | 35 |

The inventive polymer compositions show improved gloss and reduced haze compared to the comparative example.

The invention claimed is:

1. A multimodal polymer of ethylene with at least two different comonomers selected from alpha-olefins having from 4 to 10 carbon atoms,
which has
a) $MFR_2$ of 0.5 to 10 g/10 min (according to ISO 1133 at 190° C. under 2.16 kg load),
b) $MFR_{21}/MFR_2$ of 13 to 35 ($MFR_{21}$ at 190° C. under 21.6 kg load) and
c) Mw/Mn of 4.5 to <6;
　and which comprises at least
　　an ethylene polymer component (A), comprising ethylene polymer fraction (A-1) and ethylene polymer fraction (A-2) and
　　an ethylene polymer component (B),
　　wherein the $MFR_2$ of the ethylene polymer components (A) and (B) are different from each other,
　　wherein the $MFR_2$ of the ethylene polymer fractions (A-1) and (A-2) are different from each other,
　　wherein the density of the ethylene polymer fractions (A-1) and (A-2) are different by 5 $kg/m^3$ up to 35 $kg/m^3$;
　　wherein the ethylene polymer fraction (A-1) has a $MFR_2$ of 0.01 0.1 to 10 g/10 min;
　　wherein the ethylene polymer fraction (A-2) has a $MFR_2$ of greater than 10.0 to 150.0 g/10 min;
　　wherein the ethylene polymer component (A) has a $MFR_2$ of greater than 1.0 to 50 g/10 min; and
　　wherein the ethylene polymer component (B) has a $MFR_2$ of 0.01 to 1.0 g/10 min.

2. The multimodal polymer of ethylene according to claim 1, wherein
the ethylene polymer fraction (A-1) has a $MFR_2$ of 0.1 to 5.0 g/10 min;
the ethylene polymer fraction (A-2) has a $MFR_2$ of 12.0 to 130 g/10 min;
the ethylene polymer component (A) has a $MFR_2$ of 1.5 to 40 g/10 min; and
the ethylene polymer component (B) has a $MFR_2$ of 0.05 to 0.95 g/10 min.

3. The multimodal polymer of ethylene according to claim 1, wherein the $MFR_2$ of ethylene polymer component (A) is higher than the $MFR_2$ of ethylene polymer component (B), and wherein the ratio of the $MFR_2$ of ethylene polymer component (A) to the $MFR_2$ of the final multimodal polymer of ethylene is of 2.0 to 40.

4. The multimodal polymer of ethylene according to claim 1, wherein the at least two alpha-olefin comonomers having from 4 to 10 carbon atoms are 1-butene and 1-hexene.

5. The multimodal polymer of ethylene according to claim 2, wherein the multimodal polymer of ethylene is further multimodal with respect to comonomer type and/or comonomer content, wherein the alpha-olefin comonomer having from 4 to 10 carbon atoms of ethylene polymer component (A) is different from the alpha-olefin comonomer having from 4 to 10 carbon atoms of ethylene polymer component (B), or
　wherein the alpha-olefin comonomer having from 4 to 10 carbon atoms of ethylene polymer component (A) is 1-butene and the alpha-olefin comonomer having from 4 to 10 carbon atoms of ethylene polymer component (B) is 1-hexene,
　whereby the comonomer type of ethylene polymer fractions (A-1) and (A-2) is the same, or
　the comonomer type of ethylene polymer fractions (a-1) and A-2) is 1-butene.

6. The multimodal polymer of ethylene according to claim 1, wherein the total amount (mol %) of alpha-olefin comonomer having from 4 to 10 carbon atoms, present in the ethylene polymer component (A) is of 0.03 to 5.0 mol % and wherein the total amount of comonomers present in the multimodal polymer of ethylene is of 0.5 to 10 mol %, and
　wherein the amount (mol %) of alpha-olefin comonomer having from 4 to 10 carbon atoms present in the ethylene polymer component (B) is higher than the amount (mol %) of alpha-olefin comonomer having from 4 to 10 carbon atoms present in the ethylene polymer component (A).

7. The multimodal polymer of ethylene according to claim 2,
　wherein the multimodal polymer of ethylene is further multimodal with respect to density, or
　the ethylene polymer fractions (A-1) and (A-2), as well as ethylene polymer component (A), have different or higher density than the density of the ethylene polymer component (B).

8. The multimodal polymer of ethylene according to claim 1, wherein the density of the ethylene polymer fractions (A-1) and/or (A-2), as well as of polymer component (A) is from 920 to 960 $kg/m^3$, and the density of the ethylene polymer fractions (A-1) and (A-2) are different by 5 $kg/m^3$ up to 30 $kg/m^3$ and/or the density of the ethylene polymer component (B) is from 880 to less than 910 $kg/m^3$.

9. The multimodal polymer of ethylene according to claim 1, wherein the density of the multimodal polymer of ethylene is from 910 to 935 $kg/m^3$.

10. The multimodal polymer of ethylene according to claim 1, wherein the multimodal polymer of ethylene has $MFR_{21}/MFR_2$ of 13 to 30.

11. The multimodal polymer of ethylene according to claim 1, wherein the multimodal polymer of ethylene is multimodal with respect to MFR, type of the comonomer, comonomer content and density.

12. The multimodal polymer of ethylene according to claim 1, wherein multimodal polymer of ethylene has a haze (measured on 40 μm blown films according to ASTM D 1003-00) of between 15 to below 32%, and/or a gloss (measured on 40 μm blown films at an angle of 45° in MD according to ASTM D2457) of above 20% up to 60%.

13. The multimodal polymer of ethylene according to claim 1, wherein the multimodal polymer of ethylene has a dart-drop impact strength (DDI) determined according to ASTM D1709, method A on a 40 μm multilayer blown film of at least 350 g up to 2500 g, and/or a tensile modulus determined according to ISO 527 at 23° C. on films with a thickness of 40 μm in machine direction as well as in transverse direction in the range of from 100 to 500 MPa.

14. The multimodal polymer of ethylene according to claim 1, wherein the multimodal polymer of ethylene is produced using a single site catalyst, or wherein the ethylene polymer component (A), including ethylene polymer fractions (A-1) and (A-2), and ethylene polymer component (B) of the multimodal polymer of ethylene are produced using same single site catalyst and/or wherein the multimodal polymer of ethylene (1) has an Mw/Mn between 4.5 and less than 6.0.

15. An article comprising the multimodal polymer of ethylene according to claim 1 or a film comprising at least one layer which comprises the multimodal polymer of ethylene according to claim 1.

16. The multimodal polymer of ethylene according to claim 6, wherein the alpha-olefin comonomer having from 4 to 10 carbon atoms, present in the ethylene polymer component (B), is 1-hexene, and the alpha-olefin comonomer having from 4 to 10 carbon atoms, present in the ethylene polymer component (A), is 1-butene.

17. The multimodal polymer of ethylene with at least two different comonomers selected from alpha-olefins having from 4 to 10 carbon atoms according to claim 1, made by a process comprising using a single site catalyst, wherein the ethylene polymer fractions (A-1) and (A-2) and the ethylene polymer component (B) are produced using the same single site catalyst.

* * * * *